United States Patent [19]

Compeau et al.

[11] Patent Number: 4,861,089

[45] Date of Patent: Aug. 29, 1989

[54] VEHICLE VENTING ARRANGEMENT RESPONSIVE TO SIDE DOOR OPENING AND CLOSING

[75] Inventors: David E. Compeau, Mt. Clemens; Lloyd W. Rogers, Utica; Robert J. Myslicki, W. Bloomfield, all of Mich.

[73] Assignee: General Motors Corporation, Detroit, Mich.

[21] Appl. No.: 237,485

[22] Filed: Aug. 29, 1988

[51] Int. Cl.[4] .............................................. B62D 25/10

[52] U.S. Cl. ...................................... 296/76; 292/201; 292/262; 292/DIG. 44; 49/280; 296/146

[58] Field of Search ................... 296/56, 76, 106, 146; 292/201, 262, DIG. 43, DIG. 44, DIG. 60; 49/72, 276, 280

[56] References Cited

U.S. PATENT DOCUMENTS

| | | | |
|---|---|---|---|
| 2,696,981 | 12/1954 | Ayers | 49/72 X |
| 2,833,536 | 5/1958 | Joachim et al. | 49/280 X |
| 2,916,319 | 12/1959 | DuBois | 296/76 X |
| 2,943,880 | 7/1960 | Joachim et al. | 292/201 |
| 3,024,062 | 3/1962 | Himka et al. | 49/72 X |
| 4,571,884 | 2/1986 | Hetmann et al. | 296/146 X |
| 4,739,585 | 4/1988 | Pickles | 49/280 |
| 4,746,153 | 5/1988 | Compeau et al. | 292/DIG. 43 X |
| 4,796,932 | 1/1989 | Tame | 292/DIG. 43 X |

*Primary Examiner*—Robert B. Reeves
*Assistant Examiner*—Gary C. Hoge
*Attorney, Agent, or Firm*—William A. Schuetz

[57] ABSTRACT

A venting arrangement for an automotive vehicle is provided in which its rear closure is automatically raised to a slightly open position in response to opening a door of the vehicle so that upon closing the door, entrapped air in the vehicle can escape through the rear to reduce door closing effort. The arrangement includes a latch and pull down mechanism for the rear closure of the vehicle to move the same between a partially open and a closed position and a control means including door jamb switches for energizing the pull down unit to raise the rear closure to its partially open position in response to opening movement of the door and to return the same to its fully closed position in response to closing of the door.

4 Claims, 3 Drawing Sheets

VEHICLE VENTING ARRANGEMENT RESPONSIVE TO SIDE DOOR OPENING AND CLOSING

The present invention relates to an automotive vehicle in which its rear closure is automatically raised to a slightly open position in response to opening a door of the vehicle so that upon closing the door entrapped air in the vehicle can escape through the rear thereof to reduce door closing effort.

Certain automotive vehicles, such as two door sport cars, have a passenger compartment space which is fairly small when compared to larger sedans. These cars also usually have large side doors. The combination of a very small interior and large side doors makes door closing effort more difficult due to air resistance as a result of the air being pushed into and being expelled from the car during door closing.

To alleviate this problem, it is known that providing a venting arrangement by lowering a side window a predetermined amount upon opening the door enables entrapped air to escape through the partially open window upon reclosing the door to reduce door closing effort. Such an arrangement is shown in U.S. Pat. No. 4,571,884. However, this type of arrangement requires the use of fairly complicated timing circuits.

It is also common in the above mentioned types of vehicles, such as two door sport cars, to have a rear sloping closure or hatchback for covering a rear compartment which is in communication with the main passenger compartment and to provide a latch and pull-down mechanism for latching the rear closure to the vehicle body when the rear closure is moved to a partially closed position and then to pull the rear closure downwardly to a fully closed position in tight engagement with a seal surrounding the rear compartment.

The present invention is directed to the novel concept of providing a control means for energizing the latch and pull down mechanism to automatically raise the rear closure to a partially closed position (or a partially open position) in which the rear and passenger compartments are in communication with the ambient atmosphere in response to door opening movement and then automatically energize the latch and pull down mechanism for reverse movement to move the rear closure to its fully closed position in response to the door being moved to its closed position.

Accordingly, an important object of the present invention is to provide a new and improved venting arrangement for an automotive vehicle, preferably a two door vehicle, having a latch and pull down mechanism for latching its rear closure to the vehicle body when moved to a partially closed position and to pull down the rear closure to a fully closed position, and which includes a control means which is automatically operable in response to door opening movement to energize the latch and pull down mechanism to raise the closure to its partially open position and which is automatically operable upon door closing movement to reverse the direction of the latch and pull down mechanism to move the closure to its fully closed position, whereby door closing effort when compared to a similar vehicle not having such a venting arrangement, is substantially reduced.

Another object of the present invention is to provide a new and improved venting arrangement for an automotive vehicle, as defined in the next preceding object, and which includes a door jamb switch for effecting energization of the latch and pull down mechanism to raise the rear closure in response to movement of the door to an open position and which effect reverse movement of the latch and pull down mechanism to return the closure to its fully closed position in response to the door being closed.

Yet another object of the present invention is to provide a new and improved venting arrangement for an automotive vehicle, as defined in the next preceding object, and in which the latch and pull down mechanism includes a latch assembly which remains latched to the closure member during up and down movement in response to energization of the latch and pull down mechanism by opening and closing the door.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which.

Figure 1:
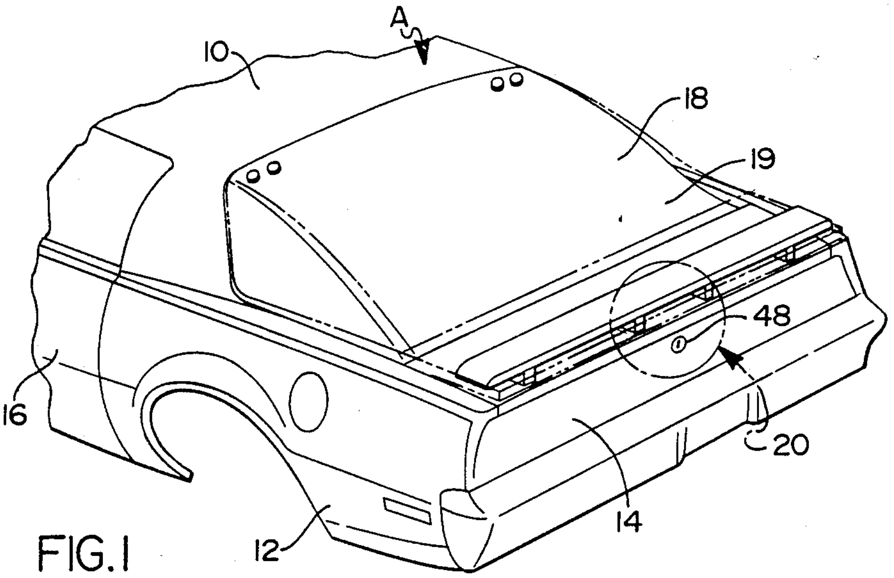
FIG. 1 is a fragmentary perspective view of an automotive vehicle and showing a hatchback in its closed and partially closed positions.
Figure 2:
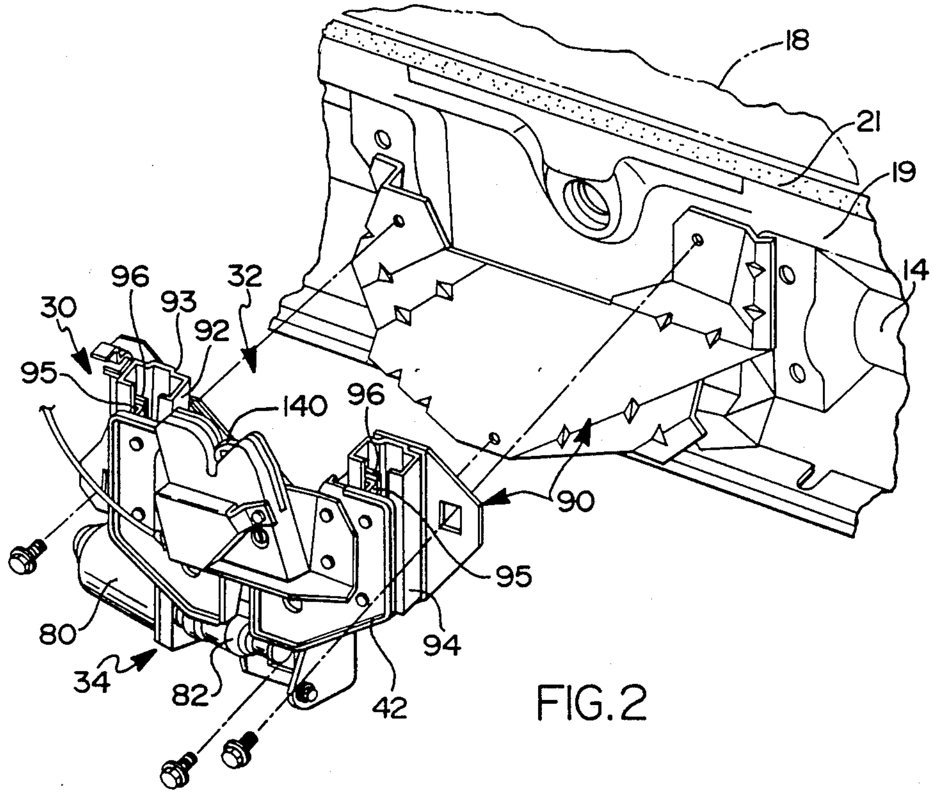
FIG. 2 is an exploded perspective view of a latch and pull down mechanism for use with the hatchback vehicle shown in FIG. 1.

Referring to FIG. 1 of the drawings, an automotive vehicle A is thereshown. The vehicle A is preferably a two door sports type car and includes a roof 10, side body structure 12, rear end body structure 14, left and right side doors 16 (only the left door 16 being shown in the drawings) and a hatchback 18 covering a rear or trunk compartment 19 in the vehicle A. The hatchback 18 is pivotally supported by hinges (not shown) adjacent the roof for movement between an open position, a partially closed position, and a fully closed position in which it overlies the rear compartment 19 and is in tight engagement with a suitable seal 21 (see FIG. 5) carried by the vehicle body structure 12, 14 and surrounding the rear compartment 19. The vehicle A would also include a passenger compartment which is in communication with the rear compartment 19. The hatchback 18 would further be biased upwardly by a suitable means, such as springs, so that when the hatchback 18 is opened, it will be automatically moved upwardly toward its open position.

As best shown in FIGS. 2–6, the vehicle A also includes a suitable latch and pull down mechanism 30 for latching the hatchback 18 to the rear body structure 14 of the vehicle A, the latch and pull down mechanism 30 being located in the area designated by the circle 20 in FIG. 1. The latch and pull down mechanism 30, when the hatchback 18 is moved to its partially closed position, pulls the hatchback 18 down further and into tight engagement with the seal surrounding the rear compartment 19 to a fully closed position.

The latch and pull down mechanism 30 could be of any suitable or conventional construction but is shown in FIG. 2 through 6 as generally comprising a striker 31, a latch assembly 32 and a pull down unit 34.

The striker 31 is generally U-shaped to define a generally horizontally extending bight portion 31*a* and is adapted to be secured to the underside of the hatchback 18 in any suitable manner, such as by bolts 36. The striker 31 extends downwardly from the underside of the hatchback and is adapted to cooperably engage the latch assembly 32.

Figure 5:
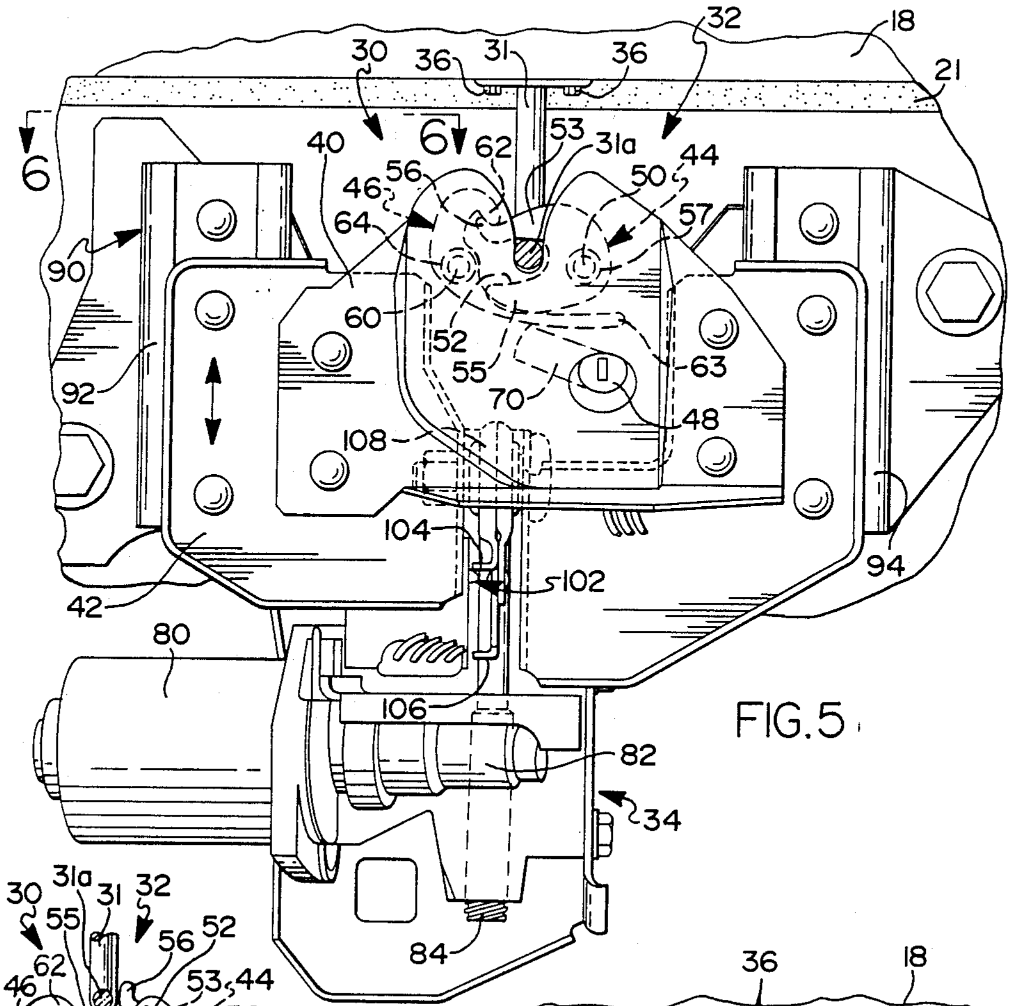
FIG. 5 is an enlarged fragmentary side elevational view of the latch and pull down mechanism shown in FIG. 3, but showing the hatchback in its fully closed position.
Figure 4:
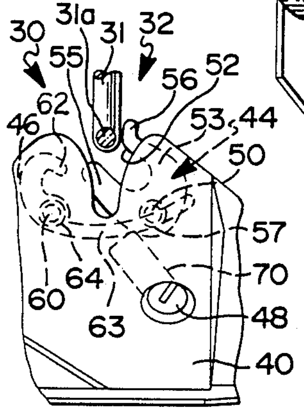
FIG. 4 is a fragmentary side elevational view like that shown in FIG. 3, but showing different parts thereof in different positions.
Figure 3:
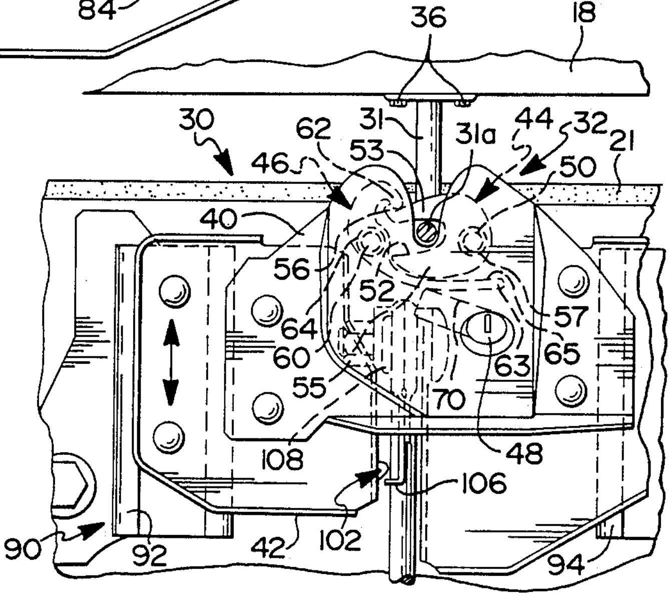
FIG. 3 is a fragmentary side elevational view of the latch and pull down mechanism shown in FIG. 1 and with the hatchback being shown in its partially open position.

The latch assembly 32 comprises a support housing 40 which is adapted to be secured or riveted to a vertical slide support 42, a latch 44 pivotally supported by the housing 40 for movement between a latched position, as shown in FIGS. 3 or 5, and an unlatched position, as shown in FIG. 4, a detent lever 46 which is pivotally supported by the housing 40 for movement between a detented or first position, as shown in FIGS. 3 and 5, in which it holds the latch 44 in its latched position and a release or second position, as shown in FIG. 3, in which it releases its engagement with the latch member 44, and a key operated lock cylinder 48 cooperably engageable with the detent lever 46 for effecting movement of the same from its detented position to its release position to allow the hatchback 18 to be opened when a proper bitted key is inserted in the lock cylinder 48.

The latch 44 is pivotally supported by the housing 40 by a pivot pin means 50 and is provided with a slot 52 to define an upper end or end portion 53 which is adapted to overlie the bight portion 31*a* of the striker 31 and a lower cam portion 55 disposed beneath the bight portion 31*a* of the striker 31 when the latch 44 is in its latched position, as shown in FIGS. 3 and 5. The upper end portion 53 also terminates in a hook 56 at its free end. The latch 32 is adapted to be spring biased toward an unlatched position, as shown in FIG. 4, by a torsion spring means 57, which surrounds the pivot pin means 50 and has one end secured to the latch 44 and its other end secured to the housing 40.

The latch 44 is adapted to be held in its latched position in opposition to the biasing force of its spring 57 by the detent lever 46. The detent lever 46 is pivotally connected to the housing 40 by a pivot pin means 60. The detent lever 46 has a detent or hook 62 at one end which is adapted to engage or hook over the hook 56 on the latch 44 to hold the same in its latched position and has a leg 63 which is adapted to be cooperably engaged by the lock cylinder 48. The detent lever 46 is biased toward its detented position, as shown in FIGS. 3 and 5, by a torsion spring 64 surrounding the pivot pin means 60 and having one end engaged with the detent lever 46 and its other end secured to the housing 40. Both the torsion spring 57 and the torsion spring 64 respectively bias the latch 44 and the detent lever 46 for movement in a clockwise direction, as viewed in FIGS. 3 and 5.

The latch member 44 is adapted to be unlatched from the striker 31 to allow the hatchback 18 to be moved from its fully closed position toward an open position in response to manual operation of the lock cylinder 48. When a properly bitted key is inserted into the lock cylinder 48 and rotated, a cam 70 carried by the lock cylinder engages the leg 63 of the detent lever 46 and causes the detent lever 46 to be rotated in a counterclockwise direction about its pivot 60 and in opposition to the biasing force of the torsion spring 64. This releases the latch 44 for movement toward its unlatched position by the biasing force of the torsion spring 57. Movement of the latch 44 toward its unlatched position, as shown in FIG. 4, allows the springs (not shown) to exert an upward biasing force on the hatchback 18 to move the hatchback 18 from its fully closed position toward its open position.

The hatchback 18 when moved from an open position towards its closed position causes the striker 31 to engage the cam portion 55 of the latch 44. Further movement of the striker 31 downwardly causes the latch 44 to be pivoted in a counterclockwise direction, as viewed in FIGS. 3–5, in opposition to the biasing force of the torsion spring 57 so that the upper end portion 53 overlies the striker 31. At the same time the hook end 56 on the latch 44 will cause the detent lever 46 to be pivoted in a counterclockwise direction until the hook 56 clears the hook 62 on the detent lever 46 whereupon the torsion spring 64 will return the detent lever toward its detented position, as shown in FIGS. 3 and 5, in which it overlies the hook 56 on the latch 44 to latch the same in its latched position.

When the hatchback 18 is moved from an open position to its latched position, it will initially only be in a partially closed (or partially open) position, as shown in FIG. 3, in which the passenger compartment and rear compartment 19 will still be vented to the outside ambient atmosphere. Movement of the hatchback 18 from its partially closed position, as shown in FIG. 3, to its fully closed position as shown in FIG. 5, is effected by the pull down unit 34.

The pull down unit 34 comprises the vertical slide 42, a reversible electrical motor 80, and a conventional drive unit 82, including a worm and worm gear (not shown) which is in meshed engagement with a jackscrew 84. The jackscrew 84 is suitably supported by the drive unit 82 for vertical up and down movement and has its upper end rotatably connected with the slide 42 in any suitable or conventional manner to cause the slide 42 to be vertically moved up and down along a stationery support 90 which is adapted to be secured to the rear wall structure 14 defining part of the rear compartment 19.

Figure 6:
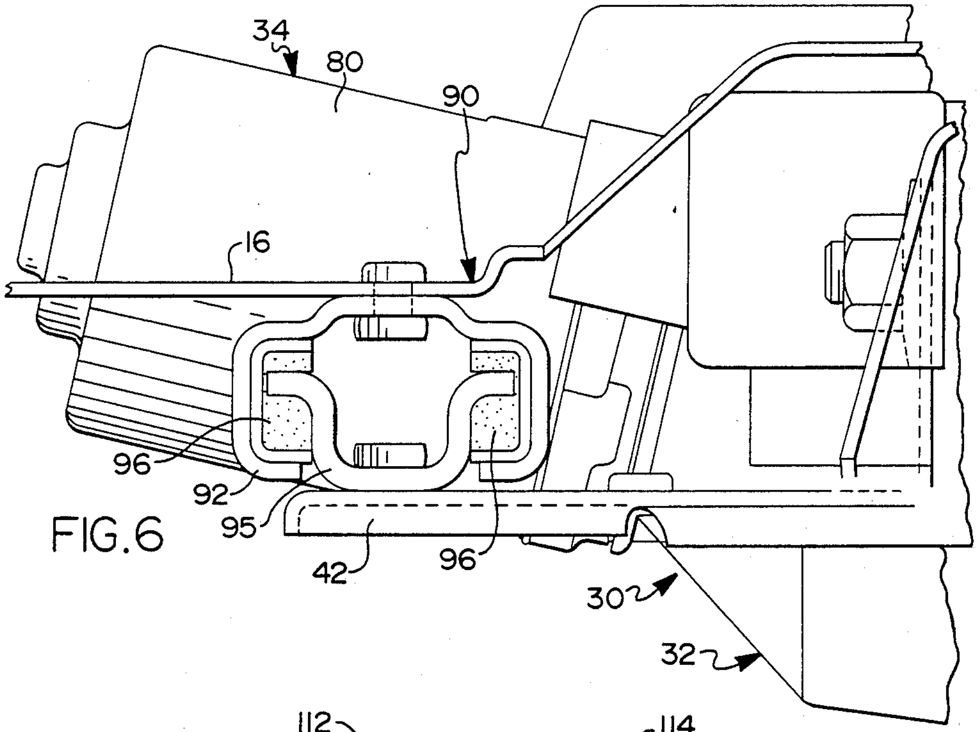
FIG. 6 is a fragmentary sectional view taken approximately along the lines 6—6 of FIG. 5.

The stationery support 90 carries a pair of horizontally spaced, vertically extending C-shaped channel tracks 92 and 94 which are riveted or bolted to the support 90, the support 90 being bolted to the rear wall 14 of the vehicle A. The slide 42 likewise carries a pair of channels 95 (only one of which is shown in FIG. 6) which are secured to the back side of the slide 42 and which are slidably received within plastic guides 96 contained in the channels 92 and 94. The guides 96 are stationary and the channels 95 can slide vertically up and down relative thereto.

From the foregoing, it should be apparent that rotation of the reversible electric motor 80 in one direction will cause the jackscrew 84 to be rotated in a direction to cause the same to move vertically upwardly which in turn will cause the slide 42 to be moved vertically upwardly. Since the latch assembly 32 is secured to the slide 42, it moves with the slide 42. Likewise, rotation of the electric motor 80 in the opposite direction will cause the jackscrew 84 to be rotated in the opposite direction to cause the same to be lowered and pull or move the slide 42 and latch assembly 32 vertically downward relative to the stationery support 90. When the latch assembly 32 has been fully moved upwardly to an extended position, the hatchback 18 is in its partially closed (or open) position, as shown in FIG. 3, and when fully lowered to a retracted position, the hatchback 18 is in its fully closed position, as shown in FIG. 5.

Figure 7:
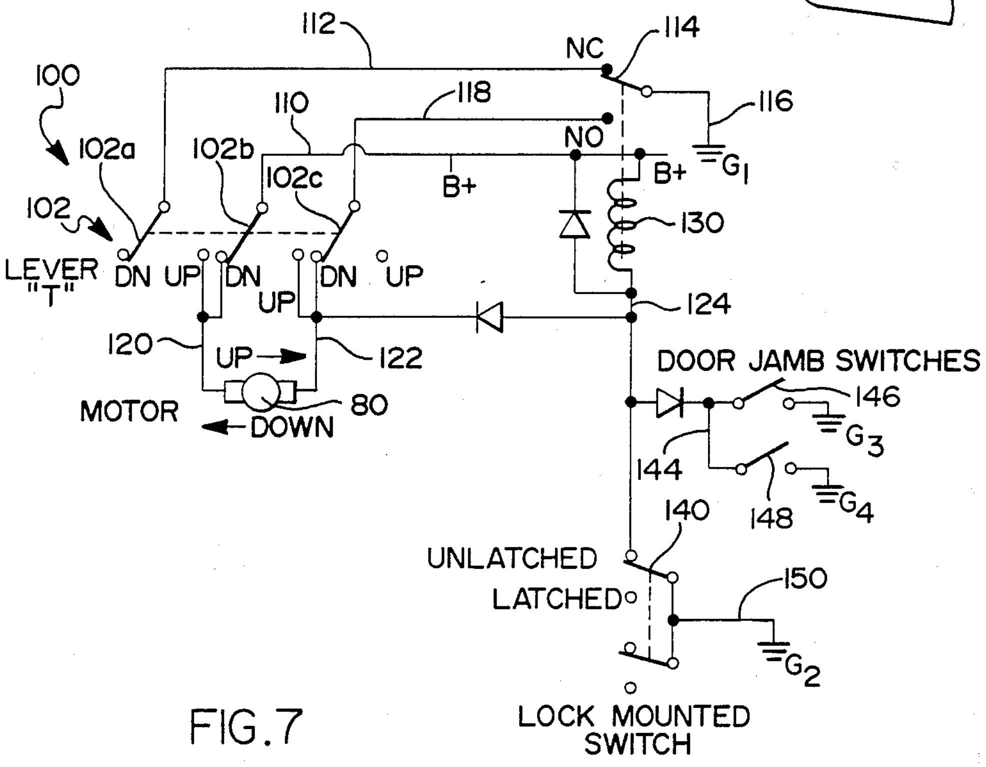
FIG. 7 is a schematic electrical diagram of the control means for controlling the operation of the latch and pull down mechanism shown in FIG. 2.

Referring to FIG. 7, the pull down unit 34 also includes an electrical control means 100 for causing the latch assembly 32 to be moved from its retracted position, as shown in FIG. 5, to its extended position, as shown in FIG. 3, in response to the lock cylinder 48 being operated to cause the latch 44 to be unlatched; for causing the latch assembly 32 to be moved from its extended position, as shown in FIG. 3, to its retracted position, as shown in FIG. 5, when the hatchback 18 is moved to its partially closed position, as shown in FIG. 3, and the latch member 44 is latched to the striker 31; for causing the pull down unit 34 to be actuated to move the latch assembly 32 to its extended position, as shown in FIG. 3, in response to a side door 16 being opened, but while the latch 44 remains latched to the striker 31; and for causing the latch assembly 32 to be moved from its extended position, as shown in FIG. 3, to its retracted position, as shown in FIG. 5, in response to the door 16 being moved from its open position to its closed position.

Referring to FIG. 7, an electrical control circuit diagram is thereshown for controlling operation of the pull down unit 34. As best shown in FIG. 7, the control means 100 includes a T lever or toggle switch 102 having three movable switches or switch contacts **102*a*, 102*b*, and 102*c*. The trip lever 102 when moved in opposite directions moves the switch contacts 102*a–c* between an associated down position stationary contact DN and an associated up position stationary contact UP, as shown in FIG. 7. The trip lever 102 is adapted to be pivoted between its positions by a pair of trip operators 104 and 106 which are vertically spaced apart and which are suitably connected to the slide 42 via a connection means 108. The trip lever 102 is moved from its UP positon to its DN position by the operator 104 when the jackscrew 84 is moved downwardly to move the latch assembly 32 to its retracted position and is tripped in the opposite direction by the operator 106 to move the same to its UP position when the jackscrew 84 is moved upwardly to move the latch assembly 32 to its extended position. The intermediate switch contact 102*b* of the T lever 102 is connected to B+ or the battery via a conductor 110. The switch contact 102*a* is connected via a conductor 112 to a normally closed contact NC of a relay switch 114, the other side of the switch being connected to a ground G1 via a conductor 116. The trip lever switch contact 102*c* is connected via a conductor 118 to a normally open contact NO of the relay switch 114. The UP contact of the switch 102*a* and the DN contact of the switch 102*b* are connected to one side of the electric motor 80 by a conductor 120. The UP contact of the switch 102*b* and the DN contact of the switch 102*c* are connected to the other side of the electric motor via a conductor 122. The relay switch 114 is adapted to be operated by its normally closed and normally open positions via a relay 130 having one side connected to B+ and its other side connected to the conductor 122 via conductor means 124. Conductor means 124 is also connected to the unlatched contact of a lock mounted switch 140, the switch 140 in turn being connected to a ground G2 via conductor 150. The lock mounted switch 140 would be a suitable spring biased switch carried by the latch housing 40 and would be depressed in opposition to its spring bias by the striker 31 to move the switch 140 to engage the contact labeled LATCHED in FIG. 7 when the latch 44 is latched to the striker 31. Upon releasing the latch member 44, the spring biased switch 140 would be caused to be moved to engage the contact labeled UNLATCHED in FIG. 7. In addition, conductor means 124 is connected via a conductor 144 to one side of a pair of door jamb switches 146 and 148, the other side of the door jamb switches being connected to grounds G3 and G4, respectively. The door jamb switches could be of any suitable or conventional type and would be spring biased toward a closed position but held in an open position in opposition to the spring bias by the door 16 when the door is closed. When the door 16 is opened the door jamb switches 146 and 148 would move to their closed position to connect conductor 144 to either ground G3 or G4 depending on which door 16** is opened.

The operation of the latch and pull down mechanism 30 will now be described. When the hatchback 18 is in the fully closed position, the various parts of the latch and pull down mechanism 30 are in the position shown in FIG. 5. If the operator desires to open the hatchback, he will insert his key into the lock cylinder 48 and rotate the same in a clockwise directon. Rotation of the lock cylinder 48 in a clockwise direction causes the cam 70 to pivot the detent lever 46 in opposition to the biasing force of its spring 64 to its released position, as shown in FIG. 3. When the detent lever 46 is rotated to its release position, it unhooks from the latch 44 to allow the torsion spring 57 to bias the latch member 44 in a clockwise direction to release the upper end 53 from the striker 31. When this occurs, the springs (not shown) move the hatchback 18 upwardly from its closed position to an open position. When the striker 31 is released from the latch member 44, and is moved upwardly by the springs (not shown), it causes the switch 140 to be disengaged and be moved from its latched position to its unlatched position, as shown in FIG. 7.

When this occurs, a circuit is completed from B+ via a relay 130, conductor 124, switch 140 to ground G2 via conductor 150. This energizes the relay 130 to move its switch 114 from its normally closed position NC, to its normally open position NO. When this occurs, a circuit is completed from B+ via conductor 110, switch **102*b*, conductor 120 to one side of the reversible electric motor 80, conductor 122, switch 102*c*, conductor 118, switch 114, conductor 116 to ground G1. Completion of this circuit energizes the motor for rotation in a direction to move the jackscrew 84 and slide 42 upwardly. This movement continues until the switch operator 106 engages the trip lever 102 to move the same from its down position to its up position and hence contacts 102*a–c* from its solid line position to the dotted line position shown in FIG. 7. When this occurs, the circuit for energizing the motor in the up direction is disconnected and the motor stops. Stoppage of the motor 80 positions the latch assembly 32 in its extended position for receipt of the striker 31**.

When the operator desires to close the hatchback 18, he will move the same downwardly toward the partially closed position, as shown in FIG. 3. As it approaches this position, the striker engages the cam portion 55 on the latch 44 and also moves the switch 140 from its unlatched position, as shown by the solid lines in FIG. 7, to its latched position, as shown by the dotted lines in FIG. 7. Further movement causes the latch 44 to be pivoted in a counterclockwise direction in opposition to the biasing force of the spring 57 and with its hook end 56 engaging the hooked end 62 of the detent lever 46 to also pivot the detent lever 46 in a counterclockwise direction until the hooked end 56 clears the hooked end 62 of the detent lever 46 whereupon the spring biased detent lever 46 will be returned to its detent position and hook behind the latch lever 44 to hold the same in its latched position in which it latches the striker to the latch 44.

Approximately simultaneously therewith, the moving of the switch contact 140 from its unlatched position to its latched position, causes the circuit for energizing the relay 130 to be broken to ground G2 and thus returns switch 114 towards its normally closed position NC.

Return of switch 114 to its normally closed position NC, causes a circuit to be completed from B+ via conductor 110, switch contact **102*b*, conductor 122 to the electric reversible motor 80, conductor 120, switch contact 102*a*, conductor 112, normally closed switch contact 114, conductor 116, to ground G1. This energizes the electric motor 80 for movement in the reverse direction which in turn causes the jackscrew 84, slide 42 and latch assembly 32 to be moved downwardly. This movement continues until the trip operator 104 connected with the jackscrew trips the lever 102 from its up position to its down position. When this occurs, the circuit via contact 102*a* is broken and the motor 80 stops and the hatchback 18** has been pulled down from its partially closed or open position, as shown in FIG. 3, to its fully closed position, as shown in FIG. 5, in which it is in tight engagement with the seal.

The pull down unit 34 is also automatically operable to move the hatchback 18 between its fully closed position to its partially closed position and vice versa in response to opening and closing movements of a vehicle door 16. When the vehicle door 16 is moved from its closed position toward an open position, the door jamb switch 146, 148 associated with the door 16 is automatically caused to be moved toward its closed position. When this occurs, an electric circuit is completed from B+ by conductor 110, relay 130, conductor 124, conductor 144, either switch 146 or 148 to either ground G3 or G4, depending on which door 16 is opened. This causes the relay 130 to be energized to move the switch 114 from its normally closed position to its normally open position. Movement of the switch 114 toward its normally open position causes the electric motor 80 to be energized for rotation to move the pull down unit 34 and latch assembly 32 upwardly to position the hatchback 18 in its partially open position, and in the same manner as hereinbefore described in c2 upwardly to position the hatchback 18 in its partially open position, and in the same manner as hereinbefore described in connection with upward movement of the latch and pull down mechanism 30. Note, however, that no circuit can be completed to ground G2 via switch 140 during this movement because the latch 44 at all times remains latched to the striker 31 and hence switch 140 is at all times maintained in its latched position. When the hatchback 18 reaches its partially open position, the motor 80 is deenergized as a result of trip operator 106 moving switch 102 from its down position DN to its up position UP.

It should be noted at this point as the door is moved from an open position to its closed position, that the effort for moving the door from its open position toward its closed position is substantially reduced as a result of less air resistance and air pressure being exerted against the door 16 as it is being closed. This is because with the hatchback 18 in its partially open position, and in communication with the ambience surrounding the atmosphere, air can escape through the rear hatchback 18 and thus significantly reduce door closing effort. It has been found that door closing effort on some models can be reduced by as much as 40 or 50% by raising the hatchback 18 to its partially open position.

When the operator again closes the door 16, the door jamb switch 146, 148 associated therewith will be moved to its open position and break the circuit for the relay 130. When the relay 130 is deenergized, the switch contact 114 moves from its normally open position to its normally closed position. In this position, an electrical circuit is completed through the trip switch 102 (which is now in the up position) to energize the electric motor 80 for movement in a down direction, and in a manner hereinbefore described for effecting downward movement of the latch assembly 32. When the hatchback 18 is pulled down to its fully closed position, the switch operator 104 will engage the trip lever 102 to move the same from its up position UP to its down position DN, which movement breaks the electrical circuit to ground G1 and causes the motor 80 to stop and be deenergized.

From the foregoing it should be apparent that a novel, simplified venting arrangement has been provided for an automotive vehicle in which a hatchback or trunk lid latch and pull down mechanism is provided. This venting feature greatly reduces door closing effort.

The embodiments of the invention in which an exclusive property or privilege is claimed are defined as follows:

1. In an automotive vehicle having a vehicle body defining an interior and provided with a door which is movable between open and closed positions, a rear closure which is supported by said body for movement between an open position, a partially closed position, in which the interior of the vehicle is still vented to the ambient atmosphere and a fully closed position in which the interior is not vented to the ambient atmosphere, a latch and pull down mechanism for latching said closure to said body when the closure is moved from an open position to its partially closed position and for moving said closure downwardly from its partially closed position to its fully closed position, said latch and pull down mechanism including a striker carried by one of said closure and body, a latch assembly carried by the other of said body and closure, and a pull down unit including a motorized drive means operatively connected to one of said striker and latch assembly for moving the same between an extended position in which the striker is engageable with the latch assembly to latch the closure to the vehicle upon the closure being moved to its said partially said closed position, and a retracted position in which the closure is in its fully closed position, and a control means including a door jamb switch for effecting operation of said motorized drive means of said pull down unit to move said one of said striker and latch assembly from its retracted position to its extended position to move said closure from its fully closed position to its partially closed position to vent the interior of the vehicle to the atmosphere in response to movement of said door from its closed position to an open position and for effecting operation of said motorized drive means to move said one of said striker and latch assembly from its extended position to its retracted position to move said closure from its partially closed position to its fully closed position in response to movement of said door to its closed position whereby said interior of said vehicle is vented during door closing to allow interior air to escape and substantially reduce door closing effort.

2. In an automotive vehicle having a vehicle body defining an interior and a door which is swingably mounted on the body for movement between open and closed positions, a rear closure which is swingably mounted on said body for movement between an open position, a partially closed position in which the interior air is still in communication with the ambient atmosphere, and a fully closed position in which the interior air is not vented to the atmosphere through the rear of the vehicle, a latch and pull down mechanism for latching said rear closure to said body when said closure is manually moved from its open position to its partially closed position and for automatically moving said closure downwardly from its partially closed position to its fully closed position, said latch and pull down mechanism including a downwardly extending striker mounted on said closure adjacent its rear end, a latch assembly, a pull down unit supported by said body adjacent the rear end of said closure, said latch assembly being supported by said pull down unit for movement between an extended position in which the striker is engageable with the latch assembly to latch the closure to the vehicle body upon the closure being moved to said partially closed position and a retracted position in which the closure is in said fully closed position, said pull down unit including a reversible motorized drive means operatively connected with said latch assembly, and an electrical control means including a door jamb switch for energizing said motorized drive means in one direction to move said latch assembly from its retracted position to its extended position to move said closure from its fully closed position to its partially closed position to vent the interior of said vehicle to the ambient atmosphere when said door jamb switch is actuated in response to movement of said door to an open position, and for energizing said reversible drive means in the opposite direction to move said latch assembly from its extended position to its retracted position to move said closure from its partially closed position to its fully closed position when said door jamb switch is actuated in response to movement of said door to its closed position whereby said interior of the vehicle is vented during door closing to allow interior air to escape and substantially reduce door closing effort.

3. In an automotive vehicle, as defined in claim 2, and wherein said motorized drive means is a reversible electric motor and said electrical control means comprises a trip switch electrically connected with a power source and said motor and which is movable between first and second positions in which it effects rotation of the motor in clockwise and counterclockwise directions, a relay operated switch for selectively connecting said trip switch to a ground, a relay for moving said relay switch and connected with the battery on one side thereof, said door jamb switch being connected to the other side of said relay and to a ground, said door jamb switch being normally open when said door is closed but closing to connect the relay to ground when the door is opened.

4. In an automotive vehicle, as defined in claim 3, and wherein said latch assembly is mounted on a slide means which in turn is slidably mounted on vertical guide tracks.

* * * * *